United States Patent Office  3,548,237
Patented Dec. 15, 1970

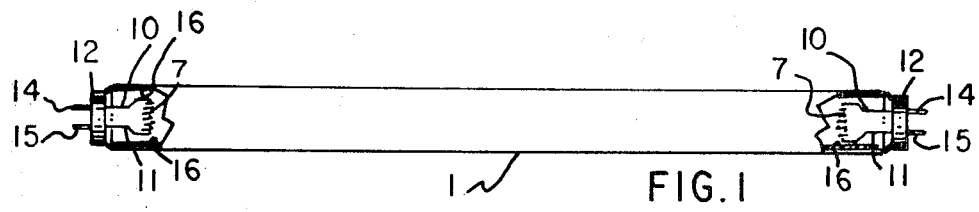
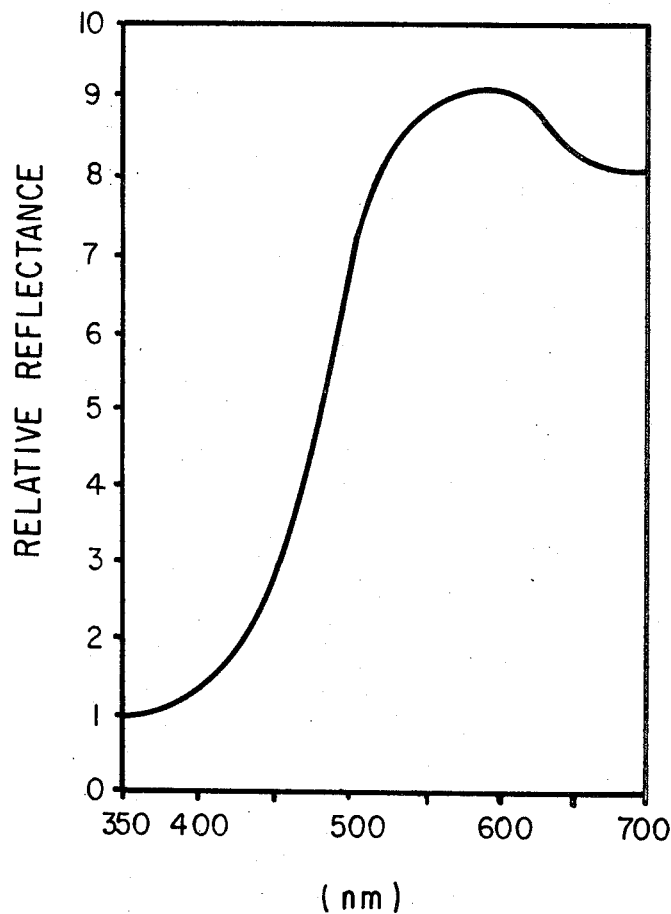

3,548,237
FLUORESCENT LAMP WITH A YELLOW INORGANIC PIGMENT ADDED TO THE PHOSPHOR
Willy P. Schreurs, Danvers, Mass., assignor to Sylvania Electric Products Inc., a corporation of Delaware
Filed Nov. 13, 1968, Ser. No. 784,981
Int. Cl. H01j 1/62, 63/04
U.S. Cl. 313—109      5 Claims

ABSTRACT OF THE DISCLOSURE

A non-fluorescent, particulate inorganic yellow pigment is added to a fluorescent phosphor. This mixture is coated upon the envelope to improve the color rendition and reduce the quantity of long-wave ultraviolet light transmitted by the lamp.

BACKGROUND OF THE INVENTION

Field of the invention

This invention relates to fluorescent lamps and particularly to those which emit in the warm tones, that is, that in which there is a substantial red rendition relative to the blue emission.

DESCRIPTION OF THE PRIOR ART

In the prior art, it has been known to dispose coatings of inorganic oxides on the lamp envelope to serve various purposes. For example, the U.S. patent to Ray, No. 3,441,990 discloses the disposition of a barrier layer of titanium, zirconia or silica to prevent an amalgam formation between sodium atoms in the soda-lime glass envelope and the mercury in the lamp.

SUMMARY OF THE INVENTION

When inorganic filters have previously been incorporated in lamps, they have generally been by way of coatings. As such, two baking steps were required, one to adhere the filter and the second to adhere the phosphor. Double baking markedly increased the sodium migration to the inner surface of the envelope and thus increased the probability of amalgam formation.

According to the present invention, it has been discovered that the emission color of a fluorescent lamp can be modified by the addition of yellow inorganic filter particles to the phosphor blend. The inclusion of these particles not only modifies the emission color of the lamp, but also absorbs unwanted ultraviolet radiation at 3650 nm. Such radiation can be detrimental to plastic fixtures in which the lamps are to be housed since the plastic can be depolymerized. Moreover, if ultraviolet light shines upon colored fabrics for an extended period of time, as would be the case with store displays, the colors tend to fade.

Thus, a "warmer-toned" fluorescent lamp with a reduced ultraviolet and blue emission is quite desirable and a marketable article of commerce. These modifications can be made, as has been mentioned above, by the addition of 1 to 5 weight percent of yellow inorganic pigment, preferably titanium dioxide, having a particle size less than 5 microns.

BRIEF DESCRIPTION OF THE DRAWINGS

FIG. 1 is a perspective view of a fluorescent lamp, partially broken away to show the inner coating of phosphor.

FIG. 2 is a reflectance curve of a material which can be used for an inorganic pigment. This pigment can be used to absorb ultraviolet and blue emission.

DESCRIPTION OF THE PREFERRED EMBODIMENT

According to the present invention, we intermix 1 to 5 weight percent of an inorganic, particulate filter which will absorb substantially all light below about 4000 A. (the ultraviolet region) and at least about 25% of the light between about 4000 and 4500 A. (the blue region). The filter should be of a composition which will be inert under lamp fabrication and processing conditions. Highly suitable are the oxides of refractory metals such as titanium dioxide, which are prepared to form a yellow pigment by conventional techniques known to the art. As mentioned previously, the color is such that substantially all light emitted below about 4000 A. by the phosphor and the mercury are absorbed together with at least about 25% of the light between 4000 and 4800 A. The inorganic pigment can be intermixed with any phosphor since it is inert, however, it is most useful when used in conjunction with those which have substantial blue emission.

An example of a phosphor blend in which the refractory oxide is useful is described in the following example. The blend contains:

|  | Weight percent |
|---|---|
| $Sr_{2.5}Mg_{.3}Ca_{0.1}(PO_4)_2$:Sn | 66 |
| $Mg_8F_2Ge_2O_{11}$:Mn | 15 |
| $Ca_{4.7}Cd_{.1}F_{.85}Cl_{.15}(PO_4)_2$:Sb,Mn | 2.5 |
| $Ba(PO_4)_1$:Ti | 12 |
| $Sr_2P_2O_7$:Sn | 1 |
| $Zn_2SiO_4$:Mn | 1 |
| Sun Yellow C [1] | 2.5 |

[1] Manufactured by the Harshaw Chemical Company of Cleveland, Ohio and being titanium dioxide having a yellow pigmentation.

The color temperature of a lamp into which this blend was incorporated is 2800° K. with a Color Rendering Index of 89%. In the Spectral Energy Distribution Curve of FIG. 2, it will be seen that there is substantially no emission below 4000 A. and hence the mercury line at 3650 A. has been substantially eliminated by absorption. Moreover, the blue region of the spectrum has been somewhat absorbed, thereby shifting the ratio of red to blue and producing a warmer color.

When the yellow titania is added to the phosphor blend the following results are attained:

|  | Color, ° K. | CRI, percent | Peak height of 3,650 A. line, percent | LPW 0 hr. | LPW 100 hrs. |
|---|---|---|---|---|---|
| Blend with 2.5% by weight $TiO_2$ | 2,700 | 90.0 | 28 | 1,734 | 1,636 |
| Control | 2,900 | 76.9 | 100 | 1,910 | 1,812 |

As seen from the color rendering index, the emission of the test lamp is close to the black body irradiation at the same temperature. The black body emission is considered to be 100%. Moreover, the U.V. line at 3650 A. is reduced thereby reducing the possibility of depolymerization of plastic fixtures and discoloration of fabric dyes.

The blend of phosphor and inorganic pigment is coated upon the lamp envelope by conventional techniques. As shown in FIG. 1, a typical fluorescent lamp containing mercury vapor is shown including a glass envelope 1 having end cap 12 with electrical lead-in wires 14 and 15 and connected to cathodes 7. The cathodes 7 are supported upon wires 10 and 11. A layer 16 of the phosphor and pigment is coated upon the internal surfaces of the glass envelope 1.

It is apparent that modifications and changes can be made within the spirit and scope of the instant invention. But it is my intention, however, only to be limited by the appended claims.

As my invention, I claim:

1. A fluorescent lamp comprising a glass tube; mercury vapor and means to produce an electric discharge within said tube; a coating disposed upon the internal surface of said envelope, said coating adapted to emit visible light when irradiated by ultraviolet light from said electric discharge, said coating including an admixture of fluorescent phosphor and a particulate, yellow titanium dioxide inorganic pigment.

2. The fluorescent lamp according to claim 1 wherein said yellow inorganic pigment absorbs substantially all ultraviolet light below about 4000 A. and at least about 25% of the light between about 4000 and 4500 A.

3. The lamp according to claim 2 wherein the pigment is inert to gases in said lamp.

4. The lamp according to claim 3 wherein said pigment has a particle size less than about 5 microns.

5. The lamp according to claims 1, 2, 3, or 4 wherein 1 to 5 weight percent of said coating is said yellow inorganic pigment.

References Cited

UNITED STATES PATENTS

| | | | |
|---|---|---|---|
| 2,195,517 | 4/1940 | Fritze et al. | 313—109 |
| 2,299,720 | 10/1942 | Holman | 313—109 |
| 3,114,065 | 12/1963 | Kaplan | 313—112X |
| 3,377,494 | 4/1968 | Repsher | 313—109 |

JAMES W. LAWRENCE, Primary Examiner

D. O'REILLY, Assistant Examiner

U.S. Cl. X.R.

117—33.5; 252—301.4; 313—112